(12) United States Patent
Satish et al.

(10) Patent No.: US 9,621,585 B1
(45) Date of Patent: Apr. 11, 2017

(54) APPLYING FUNCTIONAL CLASSIFICATION TO TUNE SECURITY POLICIES AND POSTURE ACCORDING TO ROLE AND LIKELY ACTIVITY

(75) Inventors: Sourabh Satish, Fremont, CA (US); Bruce McCorkendale, Manhattan Beach, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 147 days.

(21) Appl. No.: 13/190,186

(22) Filed: Jul. 25, 2011

(51) Int. Cl.
  G06F 17/00 (2006.01)
  H04L 29/06 (2006.01)
  H04L 12/24 (2006.01)

(52) U.S. Cl.
  CPC .......... H04L 63/20 (2013.01); H04L 63/0263 (2013.01); *H04L 29/06986* (2013.01); *H04L 41/0893* (2013.01)

(58) Field of Classification Search
  CPC ..... H04L 63/20; H04L 63/0263; H04L 63/10; H04L 63/104; H04L 63/105; H04L 12/244; H04L 12/2461; H04L 41/28; H04L 41/0893; H04L 29/06986; H04W 12/08
  USPC ............................................................ 725/1
  See application file for complete search history.

(56) References Cited

U.S. PATENT DOCUMENTS

| 7,647,622 | B1* | 1/2010 | Sobel ................. H04L 63/1425 709/229 |
| 7,841,008 | B1* | 11/2010 | Cole et al. ...................... 726/25 |
| 2004/0064731 | A1* | 4/2004 | Nguyen ............. H04L 12/2602 726/22 |
| 2006/0224742 | A1* | 10/2006 | Shahbazi ................ H04L 63/20 709/226 |
| 2007/0094711 | A1* | 4/2007 | Corley et al. ..................... 726/3 |
| 2007/0150934 | A1* | 6/2007 | Fiszman ............... H04L 63/102 726/1 |
| 2010/0169971 | A1* | 7/2010 | Raviv ............................ 726/23 |
| 2011/0083159 | A1* | 4/2011 | Brown ................. G06F 21/604 726/1 |
| 2011/0126111 | A1* | 5/2011 | Gill et al. ..................... 715/736 |

* cited by examiner

*Primary Examiner* — Daniel Potratz
(74) *Attorney, Agent, or Firm* — Patent Law Works LLP (57) ABSTRACT

Computer security threats are increasing in customization and complexity of attacks, expanding the burden on security companies in addressing the wide-array of threats. Functional classification is used here to determine the likely role a client and its user play to personalize computer security according to client/user role. A security module analyzes the client to identify data or applications present on the client or activities performed using the client. Based on this analysis, the security module predicts the role of the client or a user of the client. The module further dynamically generates a security policy that is personalized to and optimized for the client or the user based on the role predicted and on computer security threats expected to affect the client or user based on the role. The module then applies the security policy generated to provide personalized security.

19 Claims, 5 Drawing Sheets

APPLYING FUNCTIONAL CLASSIFICATION TO TUNE SECURITY POLICIES AND POSTURE ACCORDING TO ROLE AND LIKELY ACTIVITY

BACKGROUND OF THE INVENTION

Field of the Invention

This invention pertains in general to computer security, and more specifically to tuning security policies by according to certain factors.

Description of the Related Art

Malware attacks on computers are increasingly customized to target particular industries, types of users, or even specific individuals. Every type of threat, from viruses to phishing scams, is growing increasingly complex. Security threats can even combine multiple different attack mechanisms to employ complex combination attacks on computers.

In response to the increased customization and complexity of attacks, the suite of capabilities that security companies deploy in response to these attacks is correspondingly increasing in number and complexity. However, this creates a heavy burden for security companies focused on fighting these ever-growing security threats. Having an increasing number of mechanisms for responding to security threats is costly and time-consuming. Designing mechanisms to prevent these more complex, highly-customized security problems can be very difficult and typically requires a greater amount of security company resources. Security companies do not currently have the ability to intelligently balance and automatically update both the security capabilities and their posture according to the regularly evolving role of a user or machine and the attacks such user or machine will likely face.

Therefore, there is a need in the art for a solution that balances the deployed suite of security capabilities and their posture according to the needs and likely attacks that will be encountered based on what those attacks do and what industries or areas they tend to target.

DISCLOSURE OF INVENTION

The above and other needs are met by a computer-implemented method, computer system, and computer-readable storage medium in which a security module personalizes computer security based on role prediction. Embodiments of the computer-implemented method comprise analyzing a client to identify data or applications present on the client or activities performed using the client. The method further comprises predicting the role of the client or a user of the client based on the analysis. Additionally, the method includes dynamically generating a security policy that is personalized to and optimized for the client or the user based on the role predicted and on computer security threats expected to affect the client or user based on the role. The method further includes applying the security policy generated to provide personalized security to the client or the user.

Embodiments of the non-transitory computer-readable storage medium store executable computer program instructions for personalizing computer security based on role prediction. The instructions comprise instructions for performing various steps. One step includes analyzing a client to identify data or applications present on the client or activities performed using the client. Another step includes predicting a role of the client or a user of the client based on the analysis. A further step includes dynamically generating a security policy that is personalized to and optimized for the client or the user based on the role predicted and on computer security threats expected to affect the client or user based on the role. An additional step includes applying the security policy generated to provide personalized security to the client or the user.

Embodiments of the computer system comprise a system for personalizing computer security based on role prediction. A client-analysis module analyzes a client to identify data or applications present on the client or activities performed using the client. A role-prediction module predicts a role of the client or a user of the client based on the analysis. A policy-generation module dynamically generates a security policy that is personalized to and optimized for the client or the user based on the role and on computer security threats expected to affect the client or the user based on the role. Finally, a policy-application module applies the security policy generated to provide personalized security to the client or the user.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
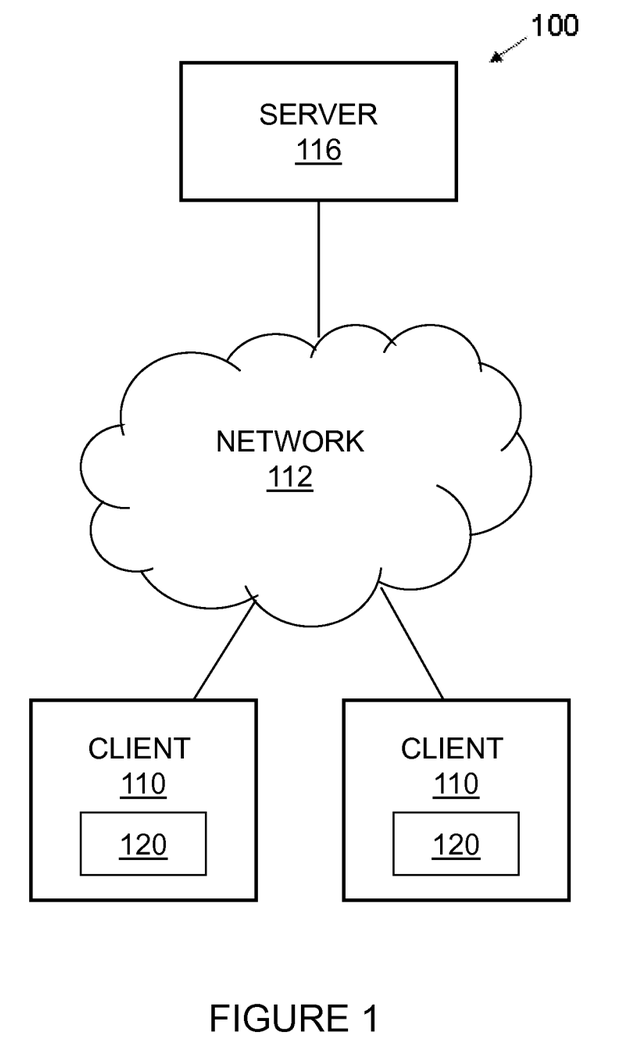
FIG. 1 is a high-level block diagram illustrating an example of a computing environment 100, according to one embodiment of the present invention.

FIG. 1 is a high-level block diagram illustrating a computing environment 100 according to an embodiment. FIG. 1 illustrates a server 116 and clients 110 connected by a network 112. Only two clients 110 are shown in FIG. 1 in order to simplify and clarify the description. Embodiments of the computing environment 100 can have thousands or millions of clients 110, as well as multiple servers 116. In some embodiments, the clients 110 are only connected to the network 112 for a certain period of time or not at all.

The server 116 serves information or content to client computers 110 via the network 112. In one embodiment, the server 116 is located at a website provided by SYMANTEC CORPORATION, although the server can also be provided by another entity. The server 116 can include a database storing information and a web server for interacting with clients 110. The server 116 can send information (e.g., information regarding data analysis performed by the server 116 to filter out applications that are commonly found on all machines, and so do not provide relevant role prediction information, etc.) stored in the database across the network 112 and to the clients 110. One or more of the functions of the server 116 can also be executed on the client 110 or in a cloud computing environment.

The clients 110 are computers or other electronic devices that can interact with the server 116 or other clients 110. The clients 110, for example, can be personal computers executing a web browser that allows the user to browse and search for information available at a website associated with the server 116. In other embodiments, the clients 110 are network-capable devices other than a computer, such as a personal digital assistant (PDA), a handheld device, a mobile telephone or smart phone, a pager, a television "set-top box," etc. The clients 110 preferably execute an operating system (e.g., LINUX®, one of the versions of MICROSOFT WINDOWS®, etc.), which controls the operation of the computer system, and executes one or more application programs. The clients 110 can perform activities and make requests for or otherwise acquire information (e.g., information about what commonly-used applications should be filtered out from the role prediction analysis) from the server 116 or other computers.

The network 112 enables communications among the entities connected to it. In one embodiment, the network 112 is the Internet and uses standard communications technologies and/or protocols. Thus, the network 112 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 112 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 112 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In the embodiment illustrated in FIG. 1, the clients 110 execute a security module 120 for personalizing computer security based on role prediction via functional classification. Functional classification is a method of determining, based on analysis of content, applications, etc., on a client 110, the likely role that a client 110 and/or its user play. Functional classification allows prediction/detection of the role(s) being played by a client 110 or a user of the client 110 based on the application and data sets on the machine over time. Knowing the role of a user and/or client 110 provides information that can be used to more intelligently configure both the suite of security technologies to deploy and how aggressively/passively those technologies should be configured. Furthermore, the roles played by clients/users change according to their tasks, so ongoing analysis and dynamic determination of role can be performed over time to dynamically dial up or down the security level for that client/user. The corresponding protection technologies for those attacks can be made mandatory for deployment and they can be configured to be aggressive.

Though current security capabilities can be configured to be more or less aggressive, they are typically configured as a collection to balance protection versus false positives with a single default policy that is delivered to all users. However, this fails to take into account what a user or client does within a company or what role such a user or client plays. A user/client in the legal department may be much more likely to deal with confidential data on a daily or regular basis, yet the same policy may be applied to a legal department user/client as is applied to a user/client in the human resources department that is less likely to deal with sensitive information. The security module 120 allows the security policy to be personalized according to a user's or client's role in the company, thereby intelligently balancing the deployed suite of security capabilities and/or their posture according to the needs and likely attacks that the user/client will encounter, with a minimum of false positives and performance impact.

The security module 120 can be a discrete application program, or the module 120 can be integrated into another application program or the client's operating system. In the embodiment of FIG. 1, the module 120 runs on a client 110, and performs the task of collecting information about the client 110 and/or user, predicting role, and dynamically generating and applying the security policy. In some embodiments, all or a portion of the security module 120 is executed on the server 116 or in a cloud computing environment. In this case, the module 120 can perform one or more of the steps of receiving information about the client 110 and/or user, performing the role prediction, and performing the dynamic security policy generation that is provided to the client 110 for application.

Figure 2:
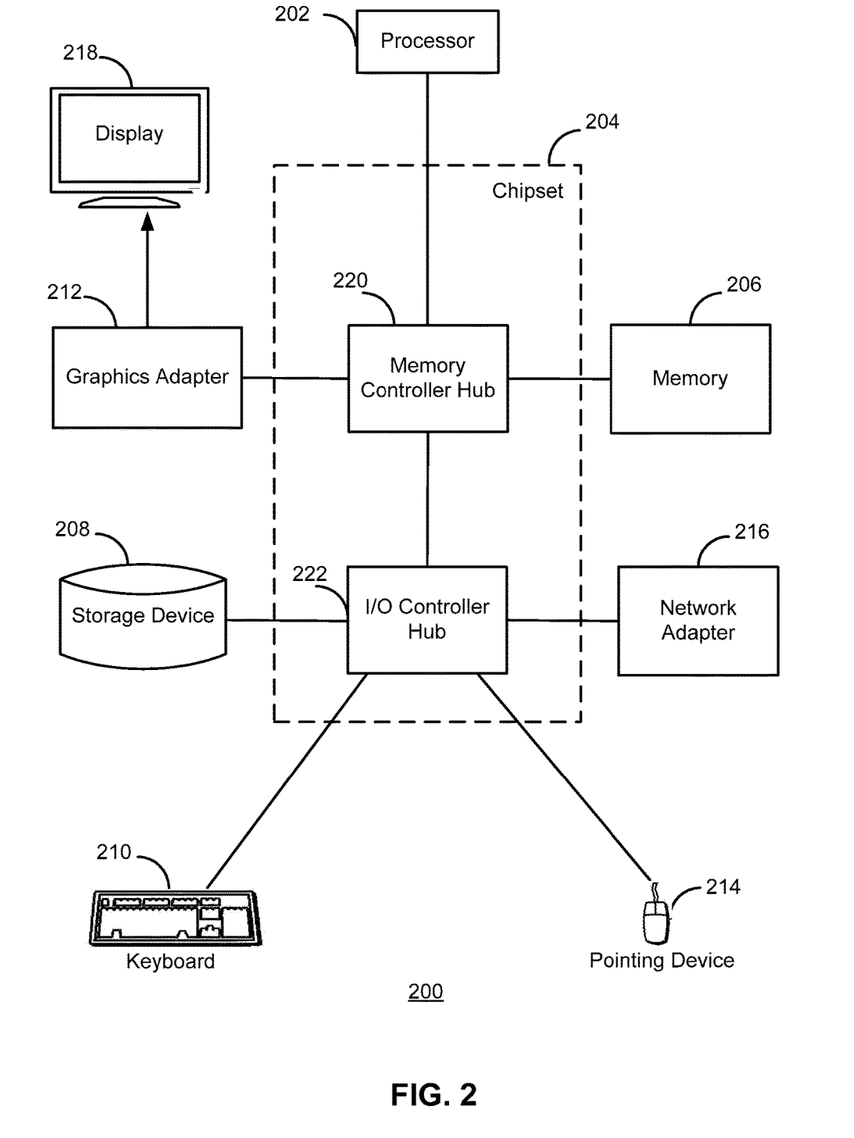
FIG. 2 is a high-level block diagram illustrating a computer system 200 for use with the present invention.

FIG. 2 is a high-level block diagram illustrating an example of a computer 200 for use as a server 116 and/or client 110. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 116. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a client 110 that is a mobile telephone typically has limited processing power, a small display 218, and might lack a pointing device 214. The server 116, in contrast, may comprise multiple blade servers working together to provide the functionality described herein.

Figure 3:
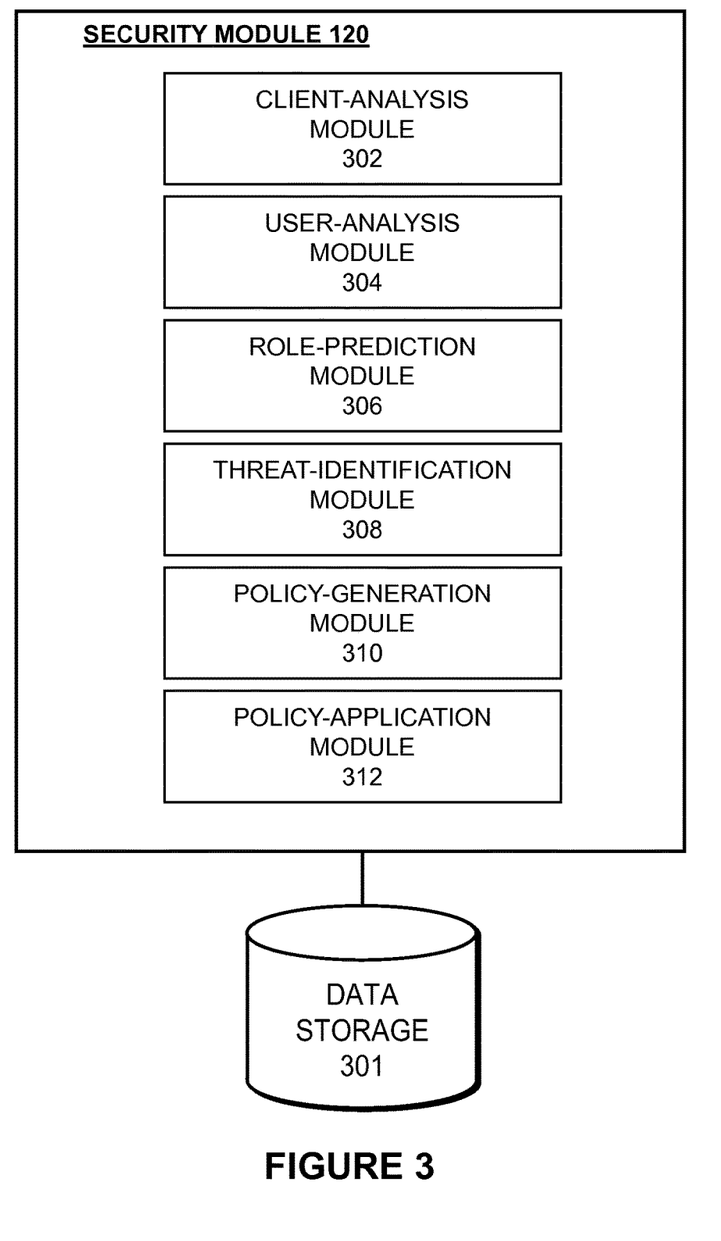
FIG. 3 is a high-level block diagram illustrating the functional modules within the security module 120, according to one embodiment of the present invention.

FIG. 3 is a high-level block diagram illustrating the functional modules within the security module 120, according to one embodiment of the present invention. The security module 120, in the embodiment illustrated in FIG. 3, includes a client-analysis module 302, a user-analysis module 304, a role-prediction module 306, a threat-identification module 308, a policy-generation module 310, and a policy-application module 312. Some embodiments of the security module 120 have different and/or additional modules than those shown in FIG. 3 and the other figures. Likewise, the functionalities can be distributed among the modules in a manner different than described herein. Certain modules and functions can be incorporated into other modules of the security module 120 and/or other entities on the network 112, including the server 116.

The client-analysis module 302 analyzes the client to identify data or applications present on the client or activities performed using the client, and the module 302 can store information collected in data storage 301. With regard to identifying applications on the client 110, the module 302 can functionally classify applications. For example, the module 302 can determine if an application is a financial application, a document-processing application, a developer tool, a network administration application, etc. The module 302 can further determine in what types of areas the application is commonly used, including identifying whether the application is one that is typically used in environments or industries that commonly handle sensitive information (e.g., the legal industry, the financial industry, etc.).

The client-analysis module 302 can determine the applications on the client 110 in various ways. The module 302 can identify all applications present on the client 110, or can instead focus on whether certain applications are present (e.g., applications that will be indicative of the role of the client 110). The module 302 can also recognize that certain applications are absent from the client 110, can determine which applications are used or are used more frequently than other applications, can detect how and when an application is used, etc. For example, a particular application being present on a client 110 may be indicative of a certain role, but a particular application being present and used regularly can be further evidence of the client's role. The module 302 can also monitor the client 110 over time to determine what applications are present and used, how and when the applications are used, and so forth.

The client-analysis module 302 can also analyze the client to identify data present on the client 110. For example, the module 302 can track what types of data are typically stored on the client, including file types and other information about the data. The module 302 can further monitor what files are interacted with, including what files are opened, closed, saved, deleted, modified, etc., on the client 110, the frequency of file usage, the frequency of usage of files of a particular type (e.g., using event logs, registries, etc.), among other factors. The module 302 can also track contents of the files and changes made to the file contents. For example, the module 302 can determine whether the files contain certain terms in the file content or file name, such as "confidential," "sensitive," "restricted," or "privileged." The module 302 can further monitor how often certain files are interacted with, how long or how frequently they are interacted with, and at what times of the day, month, year, etc., they are interacted with, what they are used for, what types of data are stored, where data are stored, among other types of information. The module 306 can further classify files based on file characteristics, such as file extension or based on keywords or template analysis. For example, the module 302 can determine that files with extensions, such as .c, .cpp, .h, .mak are source code files, but for files with extensions, such as .doc, .docx, .xlsx, the module 302 can perform content analysis and keyword matching to classify the document by type (e.g., Financial, Technical, Legal, etc.).

The client-analysis module 302 can also analyze the client to identify activities performed using the client 110. The activities can include, for example, websites visited on the client 110, intranet portal sites visited on the client 110, emails sent or received on the client 110, data or applications interacted with on the client 110, and so forth. For example, the module 302 can keep track of what websites are visited on the client 110, how frequently they are visited, when they are visited, how much time is spent visiting them, among other types of information. As another example, the module 302 can detect what emails are sent from or received by the client 110, to whom or from whom those emails are sent/received, the subject line of emails including certain keywords, the content of emails, the attachments to emails, when emails are sent/received, among other types of information. In addition, the module 302 can collect information via security applications installed on the client 110 that perform scans regularly, such as scanning of email attachments, documents opened or closed, downloads from the web, software installations, and installs from removable media, etc. These scans can be used not only to scan for threats, but also to collect information about data and applications being interacted with, or activities being performed, on the client 110 or by a user.

The user-analysis module 304 analyzes the user of the client 110 for usage in predicting the role of the user. The module 304 can store information collected over time in storage 301. The module 304 can determine, for example, an industry in which the user works, a title of the user, employment tasks of the user, among other information. For example, the module 304 can review an employment directory, intranet site, or other company information to determine a user's title or job within the company. The module 304 can further monitor the data and applications with which the user interacts, websites or intranet portal sites visited by the user, emails sent/received for the user, activities performed by the user, chat room discussions or texting performed by the user, etc. In some embodiments, there is a certain amount of overlap between the user-analysis module 304 and the client-analysis module 302. If the client 110 is only used by one user, then the analysis of the client 110 by module 302 may also provide information about the user, and the analysis of the user by module 304 may provide overlapping information about the client 110. Where multiple users interact with a single client 110, the user-analysis 304 module can provide different information about each user, and this information can be used in determining the role of each user independent of the client 110 used.

The role-prediction module 306 predicts a role of the client or a user of the client based on the analysis by the client-analysis module 302 and/or the user-analysis module 304. The module 306 can store role information in storage 301. The module 306 can correlate the presence or absence of a particular application on a client 110 to a certain role, and can further use information about frequency of usage, types of usage, times of usage, etc., to predict roles. For example, a billable time tracking application can be used by the module 306 to predict that the user/client has a role within a law firm, while a software developer's tool can indicate that the user/client has a role in the software development team of a company. As another example, if an application is only used near tax season every year, this may be indicative of a role in the tax industry. The module 306 can further use information collected about data present on a client to predict role. For example, if files including the term "confidential" are opened, stored, modified, etc. regularly, this may indicate a role in an industry that commonly deals with confidential data, such as the legal or medical industry. Similarly, the module 306 can use information about activities performed on the client 110 to predict role. For example, if the websites visited on the client 110 are websites typically visited by users on the legal team (e.g., case search websites, legal code websites, etc.), the module 306 can use this to predict a legal team role. If the emails sent from/received by the client 110 are most commonly emails sent to/received from individuals in the research and development (R&D) department, this can be used by the module 306 to predict an R&D role. The module 306 can also apply user data collected by the user-analysis module 302 to predict or refine the role predicted.

The role-prediction module 306 can further rank or score some or all of the information collected by the client-analysis module 304 and/or the user-analysis module 302. With regard to information collected about applications on a client 110, the module 306 can rank, score, or otherwise measure how predictive of role each application actually is. For example, certain applications (e.g., applications in an office application suite, etc.) may be found on many computers across many industries and are less useful for predicting role. Thus, these less-predictive applications can be scored or ranked lower or be given less importance or consideration relative to other, more-predictive applications that may be present on the client 110. In some embodiments, these less-predictive applications are filtered out and not considered. However, applications that tend to be found only on computers in certain industries or only in certain departments of companies will be more useful for predicting the role of the client, and will be scored or ranked higher. In one embodiment, a scoring system is used in which the presence of an application contributes to the score of a particular role. For example, if a software development tool is found on the client 110, this application contributes a large score to the likelihood that the client is used for software development. However, if a word processing application is found on the client 110, this application contributes small scores to roles that might use word processing.

The module 306 can also score or rank other information collected, such as data present on the client, activities performed on the client, the title of the user, and so forth. The module 306 can further score or rank all of these pieces of information against one another to best predict the role for the client and/or user. In some embodiments, the module 306 maps this information to a client and/or user role using an ontology map, an administrator-driven rules system, or a combination of both. In some embodiments, a threshold is applied, such that if a user or client is found to be associated with more than a threshold number of indicators (e.g., threshold number of applications, content, activities, or a combination of these, etc.) for a particular role, or if the user or client has a score exceeding a defined threshold score for a particular role, the user or client is predicted to have that role. In some embodiments, the module 306 uses an algorithm for role prediction and adjusts this algorithm over time as more and more data is collected about different clients/users to fine tune the algorithm to provide the best results in role prediction.

The role identified for the client 110 can take various forms. It can be a role relating to a particular industry (e.g., a client 110 having a role the clothing sales industry) or can be a role that might be found across many industries, but is specific to certain departments in various industries (e.g., a client 110 having a role in an IT department, human resources department, or hiring department). In addition, a single user can also play multiple roles in an organization simultaneously, so the user may be associated with more than one role by the role-prediction module 306.

Users and clients can also be classified in combination, since a client 110 can be used by multiple users, and since a user may use multiple clients 110. For example, the client 110 may be used occasionally by users in a department that handles confidential data and by users in a department that tend not to handle confidential data. Different roles can be predicted for these user/client combinations. Similarly, a user may use multiple clients 110 in that the user may have a work desktop or laptop client 110 that he uses when at work, a home client 110 for use at home, and one or more handheld device clients 110 for mobile use. Information can be collected about the user on any or all of these clients 110, which can be used in classifying the role of each client 110 and the role of the user. Thus, the role determined may be the same or may be different for that user depending on which of these clients 110 he is currently using.

In some embodiments, the role of a client or a user is defined as a role profile, such that there is a role profile for each user and a role profile for each client 110. The role profiles can include information collected by the client-analysis module 302 and user-analysis module 304, including information about the applications and data on the client 110, activities performed on the client 110, scoring/ranking of information collected, etc. When a user is using a particular client, the role profile for the user and the client can be combined to provide an overall combined role profile for the user/client combination.

The role-prediction module 306 can also dynamically detect changes to a client's or user's role. For example, the module 306 can detect that the client or user has changed to working on a project involving more or less handling of sensitive data than was previously handled. In this case, the role change may even be just a temporary role change. The user might normally work in the R&D department, but might be involved for a period of time in a project involving sensitive company merger data. Thus, the module 306 can even be used to detect changes in role based on different projects that a user may be working on from time to time, even though this may not be the user's primary or typical role. The module 306 can determine different projects with which a user or client is involved by using, for example, the data loss prevention (DLP) configuration for the client 110 in conjunction with functional classification of the content on the client 110 and traditional directory information about the user. Furthermore, email activity and classification can also be used (e.g., email spectroscopy). In addition, the module 306 can detect whether the client or user has switched to a new role entirely (e.g., to a new department within a company).

The threat-identification module 308 identifies one or more types of computer security threats that have affected other clients or users having a role similar to the predicted role for the client and/or user. For example, if it is detected that the client 110 is in a supervising control and data acquisition (SCADA) environment (e.g., because the user runs industrial control software), the module 308 can determine that the client 110 is likely to be targeted by STUXNET, a worm that targets industrial software equipment. In some embodiments, the threats identified by module 308 are incorporated into the role profile for a user and/or client.

The policy-generation module 310 dynamically generates a security policy that is personalized to and optimized for the client or the user based on the role predicted for the client or the user (e.g., by the role-prediction module 306) and computer security threats expected to affect the client based on the role (e.g., threats detected by the threat-identification module 308). The module 310 can store security policy information in storage 301. If a role is predicted for a user or client 110 that involves interacting more (or less) frequently with sensitive data than other users or clients, the module 310 can dynamically generate a security policy that is more (or less) restrictive than policies generated for other users or clients. In one embodiment, if the module 310 determines that the likelihood that a user or client will be targeted by a particular threat or type of threat exceeds a particular threshold, the module 310 automatically tunes the security policy to address this particular threat or type of threat. For example, if the finance department is more likely to be targeted by "spear-phishing" attacks, and a user/client is determined to be working on a finance-related project such that the user/client meets enough of the criteria (e.g., working with enough data and applications or performing activities associated with finance) to be predicted by module 306 to have a finance department role, the security policy for that user/client can be dialed up in a manner that will minimize or prevent spear-phishing attacks. Although this increased level of security may be too stringent for this user/client during normal operations and may result in many false positives, this higher security level may be appropriate while this user/client is involved in the finance department role.

As the user's or client's role changes over time, the module 310 can dynamically and automatically generate a new security policy or revise the current security policy to reflect these changes. These policy changes can be made in real time or on-the-fly, as a user's or client's role changes or as a user or client works on new projects and interacts with different types of data or applications. Similarly, the policy can change according to whether the user/client is handling more or less sensitive data than was previously handled. Where more/less confidential data is being handled, the module 310 can dynamically increase/decrease the aggressiveness of the security policy or heuristics applied for the security policy to be specific to the new role detected. The policy can change based on a role change for the client, for the user, or for both. The security policy can also be tuned for different user/client combinations. If a user uses multiple clients 110 (e.g., a laptop, a handheld, etc.), the user can have a different security policy that is automatically generated for each client 110. In some embodiments, the security policy can also be tied to different role profiles.

Various different dynamic changes can be made to a security policy to account for different roles or changes in roles. In one embodiment, based on the role predicted for the user or client, different security applications are used to protect the client than are used to protect other clients having other roles. Certain security applications may be more useful in protecting certain industries or certain types of roles within corporations than others. For example, if a particular industry is known to be plagued by particular types of threats, the security applications for clients/users in that industry can be targeted to protecting against those threat types. The SYMANTEC DEEPSIGHT™ Threat Management System tracks, by industry type, what attacks are occurring, so this is one example of a mechanism by which such information can be acquired. In addition, clients/users handling more sensitive information may have more security applications protecting them than clients that tend not to handle sensitive information. In another embodiment, based on the role predicted for the user or client, different levels of aggressiveness in security applications can be applied to protect the client.

The policy-application module 312 applies the policy generated by the policy-generation module 310. The policy applied includes intelligent configuration of the suite of security technologies to deploy and/or how aggressively/passively those technologies should be configured. Since ongoing analysis and dynamic determination of role over occurs over time, the policy applied is a more tuned security policy than the global-default policies and postures commonly used today across all users/clients in a company. While configuring behavioral and heuristic security technologies to be more aggressive tends to result in a larger number of false positives and stronger performance impact, this may be appropriate and may be a worthwhile risk for users/clients working in an area (even if only temporarily) for which security is of the utmost importance. Furthermore, if the role of the user changes over time, the set of protection technologies and/or the posture of those technologies can be changed accordingly (e.g. less aggressive heuristics, removal of strong intrusion prevention system (IPS) rules that affect performance, etc.). In addition, the policy changes can be applied dynamically without knowing the organizational structure of a company or a user's title or department.

Figure 4:
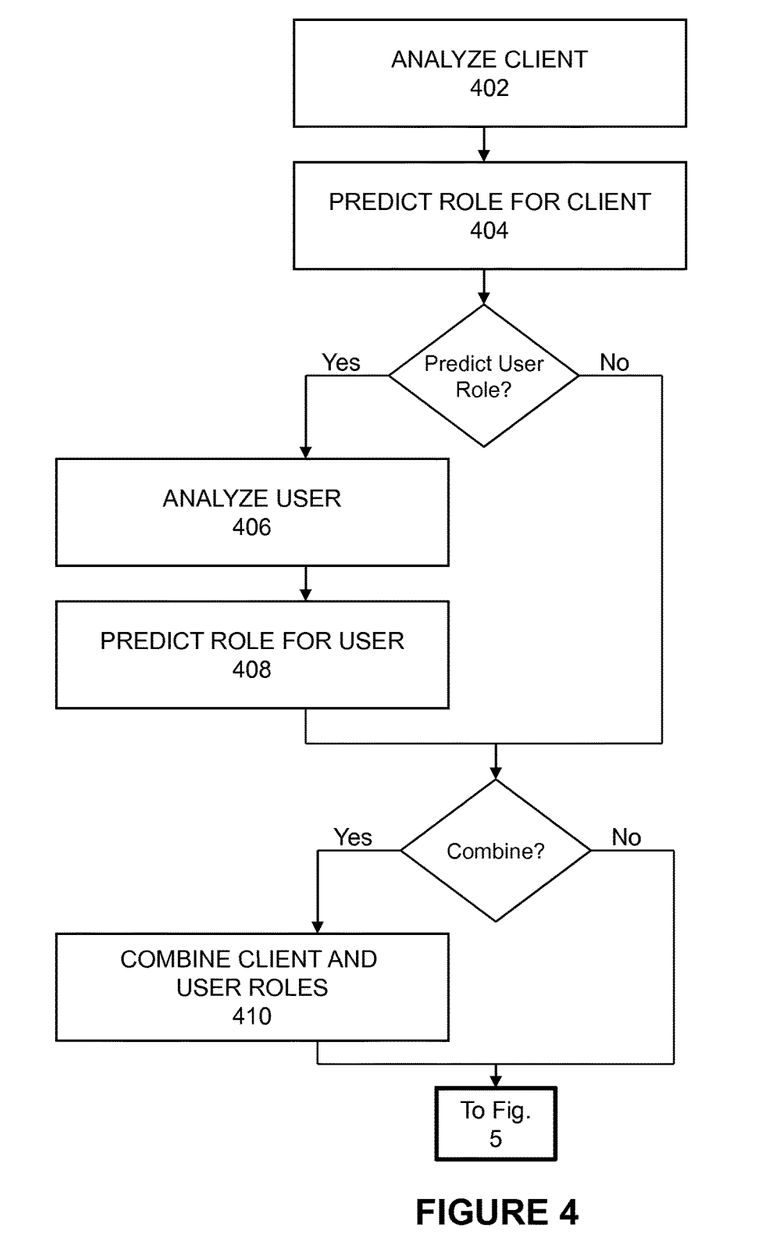
FIG. 4 is a flowchart illustrating steps performed for role prediction, according to one embodiment of the present invention.

Referring now to FIG. 4, there is shown a flowchart illustrating the operation of the security module 120, according to some embodiments of the present invention. Specifically, FIG. 4 illustrates the steps of the security module 120 involving role prediction. It should be understood that these steps are illustrative only. Different embodiments of the security module 120 may perform the illustrated steps in different orders, omit certain steps, and/or perform additional steps not shown in FIG. 4 (the same is true for FIG. 5).

As shown in FIG. 4, the security module 120 analyzes 402 the client to identify data or applications present on the client or activities performed using the client and predicts 404 the role of the client or user based on this analysis 402. In some embodiments, the security module 120 further analyzes 406 the user and predicts 408 the role of the user based on this analysis 406. In embodiments in which a role has been predicted for the user, the module 120 may also be configured to combine 410 the role predicted 404 for the client with the role predicted 408 for the user. In this manner, the module 120 can determine the role for a particular user/client combination, which can be different from the role determined for the same user with other clients or the same client with other users. As explained above, in some embodiments, prediction 404, 408 of roles for the client and/or user is performed by creating role profiles for each of the user and client, so combining 410 of roles can also include combining 410 role profiles to generate a combined profile for a user/client combination.

Figure 5:
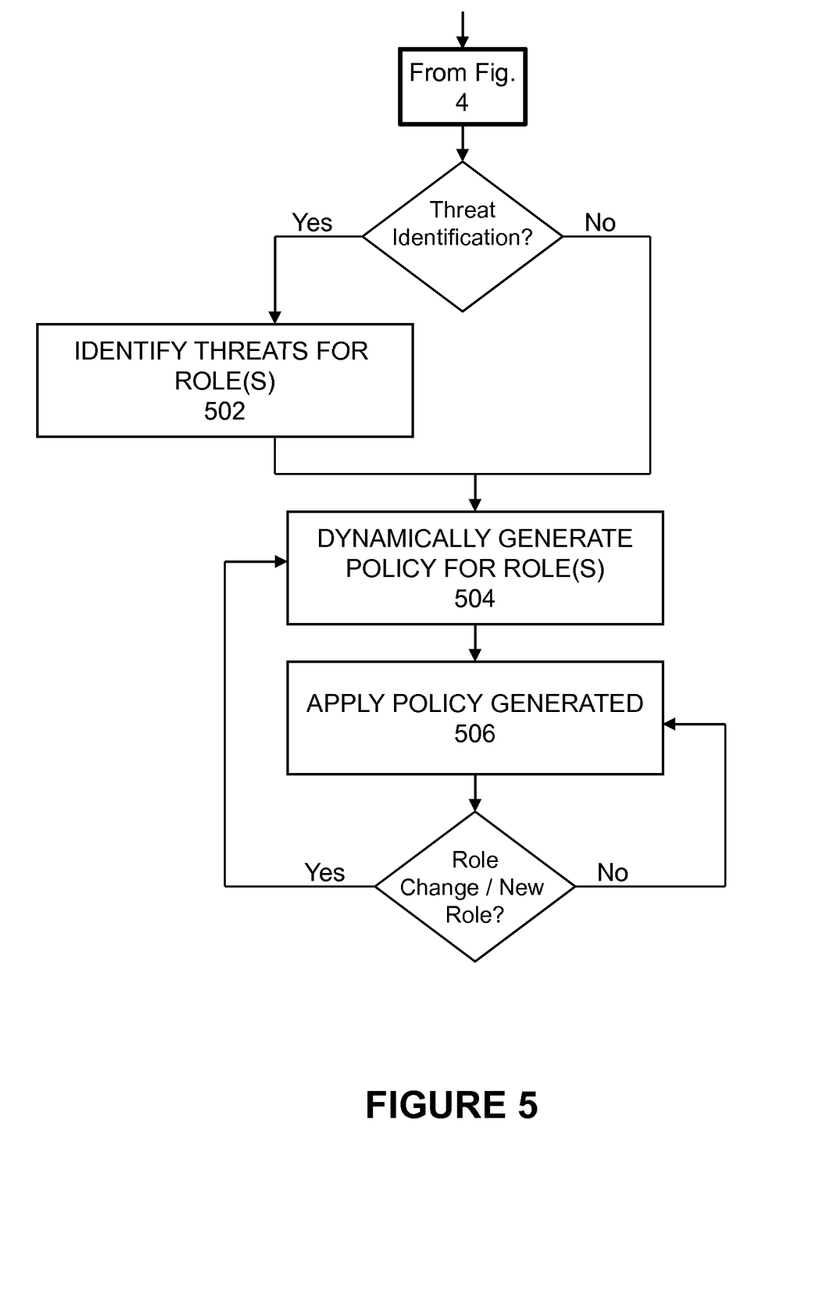
FIG. 5 is a flowchart illustrating steps performed for policy generation and application, according to one embodiment of the present invention.

Referring now to FIG. 5, there is shown a flowchart illustrating the operation of the security module 120, according to some embodiments of the present invention. Specifically, FIG. 5 illustrates the steps of the security module 120 involving policy generation and application. In some embodiments, the security module 120 identifies 502 one or more types of computer security threats that have affected other clients or users having a similar role to the predicted role. The security module 120 further dynamically generates 504 a security policy that is personalized to and optimized for the client and/or the user based on the role predicted 404 and/or 408 for the client and/or the user and based on computer security threats expected to affect the client based on the role (e.g., as identified in step 502). The security module 120 applies 506 the security policy generated to the client to provide personalized security for the client and/or the user. In addition, the module 120 can update or adjust the policy any time the user's and/or client's role changes. The module can regularly reevaluate the user's and/or client's role to determine if any changes have occurred. If so, the module 120 then dynamically generates 504 a new policy or adjusts/updates the policy to reflect the new/changed role. If the role has not changed, the module 120 can continue to apply 506 the previous policy.

As used herein any reference to embodiments means that a particular element, feature, structure, or characteristic described in connection with the embodiment is included in at least one embodiment; these terms are not necessarily all referring to the same embodiment. The particular naming and division of the modules, methodologies and other aspects are not mandatory or significant, and the mechanisms that implement the invention or its features may have different names, divisions and/or formats. Wherever a component is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the invention is in no way limited to implementation in any specific programming language, or for any specific operating system or environment. Accordingly, the disclosure of the invention is intended to be illustrative, but not limiting, of the scope of the invention, which is set forth in the following claims.

We claim:

1. A computer-implemented method of personalizing computer security based on role prediction, the method comprising:
   analyzing a client to identify data or applications present on the client, the client used by one or more users;
   predicting a role of the client based on the analysis of the client, the role prediction for the client including a correlation of presence of the identified data or applications with a likely role being played by the client;
   analyzing a user of the client to identify user activities performed by the user on one or more clients;
   predicting a role of the user based on the analysis of the user, the role prediction for the user including an association of the identified user activities with a likely role being played by the user;
   dynamically generating a first security policy that is customized to and balanced for the client based on the predicted role of the client and on computer security threats expected to affect the client based on the predicted role of the client, the dynamic generation of the first security policy comprising:
      detecting that the role predicted for the client has changed to a new role;
      identifying one or more types of computer security threats that have affected other clients having a similar role to the new role of the client; and
      responsive to the detection of the new role, dynamically updating the first security policy by updating aggressiveness of the first security policy based on the types of computer security threats identified for the client, the updated first security policy being customized for the new role of the client;
   dynamically generating a second security policy that is different from the first security policy and that is personalized to and balanced for the user based on the predicted role of the user and on computer security threats expected to affect the user based on the predicted role of the user;
   applying the first security policy generated to provide customized and balanced security to the client; and
   applying the second security policy generated to provide personalized and balanced security to the user.

2. The method of claim 1, further comprising identifying activities performed using the client, the activities being selected from a group consisting of:
   websites visited on the client, emails sent or received on the client, and data or applications interacted with on the client.

3. The method of claim 1, wherein analyzing the user of the client further comprises analyzing one or more of: an industry in which the user works, a title of the user, employment tasks of the user, data with which the user interacts, and applications with which the user interacts.

4. The method of claim 1, wherein dynamically generating a first security policy further comprises, responsive to predicting a role for the client that involves interacting more frequently with sensitive data than other clients, dynamically generating a security policy that is more restrictive than policies generated for the other clients, or wherein dynamically generating a second security policy further comprises, responsive to predicting a role for the user that involves interacting more frequently with sensitive data than other users, dynamically generating a security policy that is more restrictive than policies generated for the other users.

5. The method of claim 1, wherein dynamically generating a first security policy further comprises, based on the role predicted for the client, using different security applications to protect the client than are used to protect other clients having other roles.

6. The method of claim 1, wherein dynamically generating a first security policy further comprises, based on the role predicted for the client, applying different levels of aggressiveness in security applications to protect the client than are used to protect other clients having other roles.

7. The method of claim 1, wherein the role of the client is predicted according to a measure of how predictive the identified data or the identified applications are of the role and wherein this further comprises:
   ranking the identified data or the identified applications based on how predictive the identified data or the identified applications are of the role predicted for the client; and
   filtering out, based on the ranking, less predictive data or applications from the prediction of the role of the client.

8. A non-transitory computer-readable storage medium storing executable computer program instructions for personalizing computer security based on role prediction, the computer program instructions comprising instructions for performing steps comprising:

analyzing a client to identify data or applications present on the client, the client used by one or more users;

predicting a role of the client based on the analysis of the client, the role prediction for the client including a correlation of presence of the identified data or applications with a likely role being played by the client;

analyzing a user of the client to identify user activities performed by the user on one or more clients;

predicting a role of the user based on the analysis of the user, the role prediction for the user including an association of the identified user activities with a likely role being played by the user;

dynamically generating a first security policy that is customized to and balanced for the client based on the predicted role of the client and on computer security threats expected to affect the client based on the predicted role of the client, the dynamic generation of the first security policy comprising:

detecting that the role predicted for the client has changed to a new role;

identifying one or more types of computer security threats that have affected other clients having a similar role to the new role of the client; and     responsive to the detection of the new role, dynamically updating the first security policy by updating aggressiveness of the first security policy balanced based on types of computer security threats identified for the client, the updated first security policy being customized for the new role of the client;

dynamically generating a second security policy that is different from the first security policy and that is personalized to and balanced for the user based on the predicted role of the user and on computer security threats expected to affect the user based on the predicted role of the user;

applying the first security policy generated to provide customized and balanced security to the client; and applying the second security policy generated to provide personalized and balanced security to the user.

9. The computer-readable storage medium of claim 8, further comprising:

detecting that the role predicted for the user has changed to a new role; and responsive to the detection of the new role, dynamically updating the second security policy to be personalized and balanced based on the new role detected.

10. The computer-readable storage medium of claim 8, further comprising:

detecting that the role predicted for the user or the client has changed to a new role that involves more handling of confidential data; and responsive to the detection of the new role, dynamically modifying which security applications are used and increasing aggressiveness of the first security policy or the second security policy, respectively, to be specific to the new role detected.

11. The computer-readable storage medium of claim 8, further comprising:

detecting that the client or user has changed to working on a project involving handling of more or less sensitive data than was previously handled; and responsive to the detection, dynamically tuning the first security policy or the second security policy, respectively, to be specific to the change in project and amount of sensitive data handled.

12. The computer-readable storage medium of claim 8, wherein predicting a role of the client or a user of the client further comprises creating a role profile for the user and creating a role profile for the client.

13. The computer-readable storage medium of claim 12, further comprising combining the role profile of the client with the role profile of the user to generate a combined role profile.

14. The computer-readable storage medium of claim 8, wherein dynamically generating a first security policy further comprises, responsive to determining that a likelihood that a client will be targeted by a particular threat or type of threat exceeds a threshold, automatically tuning the first security policy to address this particular threat or type of threat, or wherein dynamically generating a second security policy further comprises, responsive to determining that a likelihood that a user will be targeted by a particular threat or type of threat exceeds a threshold, automatically tuning the second security policy to address this particular threat or type of threat.

15. A computer system for personalizing computer security based on role prediction, the system comprising:

a non-transitory computer-readable storage medium storing executable software modules, comprising:

a client-analysis module for analyzing a client to identify data or applications present on the client, the client used by one or more users, and for analyzing a user of the client to identify user activities performed by the user on one or more clients;

a role-prediction module for predicting a role of the client based on the analysis of the client and for predicting a role of the user based on the analysis of the user, the role prediction for the client including a correlation of presence of the identified data or applications with a likely role being played by the client and the role prediction for the user including an association of the identified user activities with a likely role being played by the user;

a policy-generation module for dynamically generating a first security policy that is customized to and balanced for the client based on the predicted role predicted of the client and on computer security threats expected to affect the client based on the predicted role of the client, and for dynamically generating a second security policy that is different from the first security policy and that is personalized to and balanced for the user based on the predicted role of the user and on computer security threats expected to affect the user based on the predicted role of the user, wherein dynamically generating the first security policy comprises:

detecting that the role predicted for the client has changed to a new role;

identifying one or more types of computer security threats that have affected other clients having a similar role to the new role of the client; and         responsive to the detection of the new role, dynamically updating the first security policy by updating aggressiveness of the first security policy based on types of computer security threats identified for the client, the updated first security policy being customized for the new role of the client;

a policy-application module for:

applying the first security policy generated to provide customized and balanced security to the client;

applying the second security policy generated to provide personalized and balanced security to the user; and a processor configured to execute the software modules stored by the computer readable storage medium.

16. The system of claim 15, further comprising a threat-identification module for identifying one or more types of computer security threats that have affected other clients having a similar role to the predicted role of the client or that have affected other users having a similar role to the predicted role of the user; and the policy-generation module for dynamically generating the first security policy or the second security policy that is personalized to and optimized for the client or the user, respectively, based on the types of computer security threats identified.

17. The system of claim 15, wherein a different security policy is dynamically generated for different clients based on the role of each of the clients and a different security policy is dynamically generated for different users based on the role of each of the users.

18. The system of claim 15, wherein the role prediction module is further configured for combining the roles for the client and the user.

19. The system of claim 15, wherein the role prediction module is further configured for creating a role profile for the user and creating a role profile for the client, wherein the role profiles are combined to generate a combined role profile for a combination of that user using that client, and wherein the security policy applied to the usage of the client by the user is tuned to that combined role profile.

* * * * *